United States Patent [19]
Lozier

[11] 3,842,684
[45] Oct. 22, 1974

[54] BICYCLE TRANSMISSION
[76] Inventor: Leroy P. Lozier, P.O. Box 43, Mesille, N. Mex. 88046
[22] Filed: May 17, 1973
[21] Appl. No.: 361,307

[52] U.S. Cl............................................. 74/217 B
[51] Int. Cl...................... F16h 11/04, B62m 5/00
[58] Field of Search........... 74/217 B; 280/236, 260, 280/237, 238; 180/33 B

[56] References Cited
UNITED STATES PATENTS
| | | | |
|---|---|---|---|
| 516,933 | 3/1894 | Jacoby | 280/236 |
| 3,732,787 | 5/1973 | Yamaguchi | 280/236 |

FOREIGN PATENTS OR APPLICATIONS
| | | | |
|---|---|---|---|
| 454,390 | 11/1946 | Italy | |
| 65,718 | 9/1947 | Denmark | 280/236 |

Primary Examiner—Leonard H. Gerin

[57] ABSTRACT

An improved transmission device for a bicycle, and which is mounted in place of a pedal crank so to produce as many as 15 forward speeds, and wherein the speeds may be varied without lost motion or slippage, the transmission comprising a gear box containing a gear train, and wherein there are no external sprockets except for the pedal crank's sprocket and one at the bicycle rear wheel, and a lever arm for gear selection being mounted at or near the handle bars for changing gears, the lever arm being attached to selective forks inside the transmission for changing to a desired gear ratio.

4 Claims, 2 Drawing Figures

BICYCLE TRANSMISSION

This invention relates generally to bicycles. More specifically it relates to bicycle drive mechanisms.

A principal object of the present invention is to provide a three, four and five speed automotive type transmission for a pedal-type bicycle, and which is to be mounted in place of a pedal crank.

Another object of the present invention is to provide a bicycle transmission wherein pedal energy is transmitted to the sprocket at pre-selected ratios and when used in connection with three-speed rear axle, as many as 15 forward speeds are available by changing control levers mounted on the handle bars or other desirable location.

Still another object of the present invention is to provide a bicycle transmission wherein the present invention has the advantage over current variable speed models in that all external sprockets, except for one at the transmission comprising a pedal crank, and one at a rear wheel, are eliminated.

Yet another object of the present invention is to provide a bicycle transmission wherein speeds can be varied up or down at will without lost motion or slippage.

Other objects of the present invention are to provide a bicycle transmission which is simple in design, inexpensive to manufacture, rugged in construction, easy to use and efficient in operation.

These and other objects will become readily evident upon a study of the following specification together with the accompanying drawing wherein.

Figure 1:
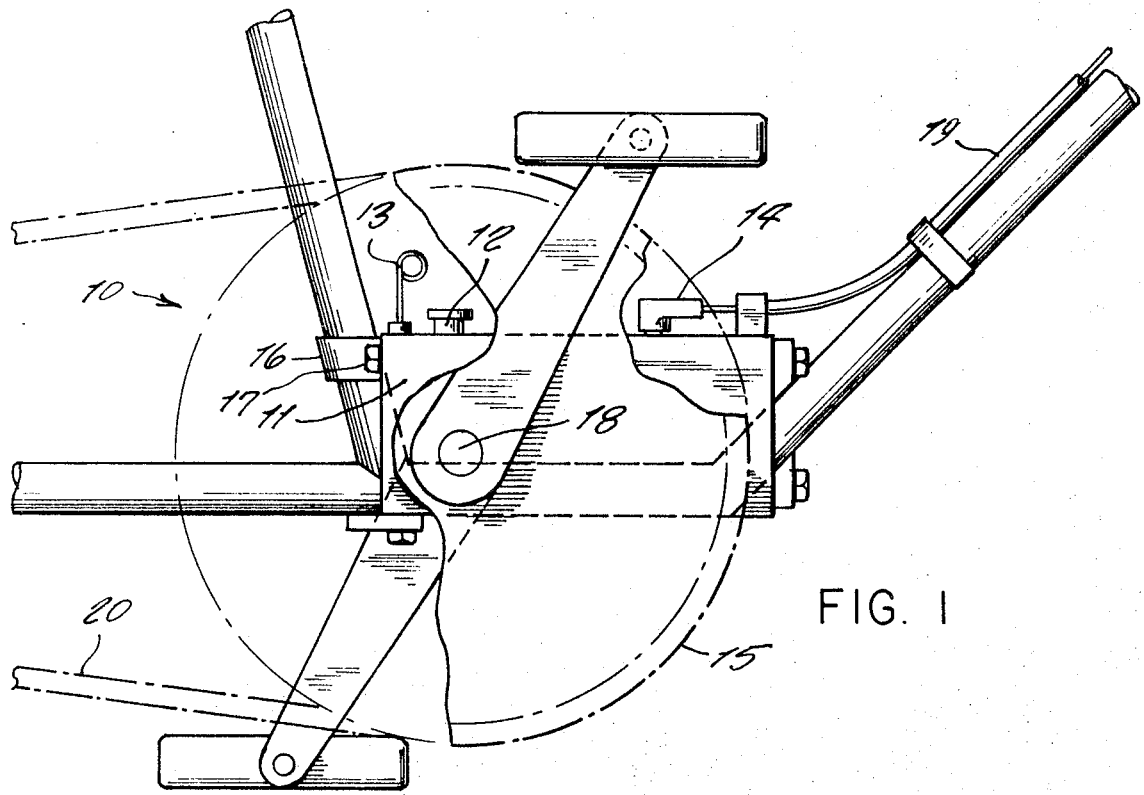
FIG. 1 is a side elevation view of the present invention and shown with parts broken away for greater clarity.
Figure 2:
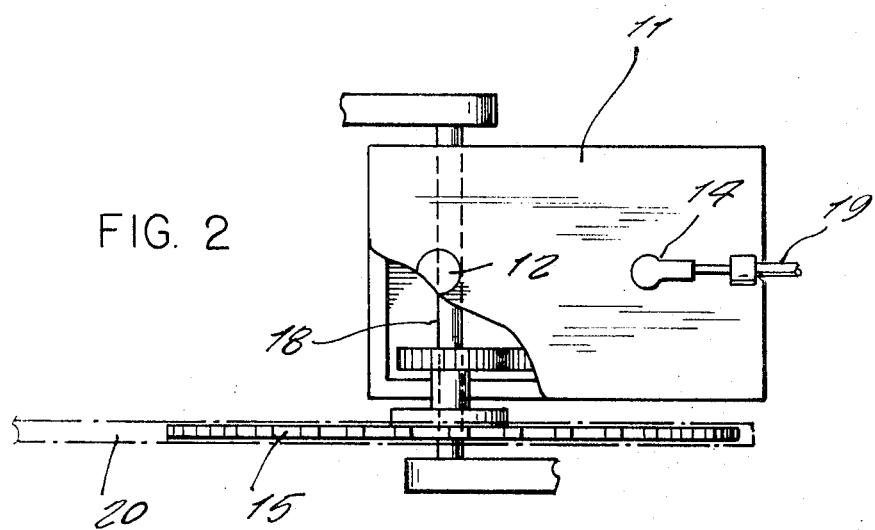
FIG. 2 is a plan view thereof, shown partly broken away.

Reference is now made to the drawing in detail, wherein there is shown a bicycle transmission 10 mounted upon a bicycle and which includes a transmission gear box 11 made of a suitable cast alloy provided with a removeable cover fitted with a suitable gasket so that the gearbox can contain lube oil therewithin. A filler plug 12 and a dip stick 13 are provided for purpose of maintaining the lube oil level. A lever arm 14 for gear selection is mounted or near the handle bars for changing the gears by an operator, the lever arm being attached to selector forks within the transmission box 11, for purpose of changing the gears within the box to a desired gear ratio; the selector fork and gears not being shown.

A sprocket 15 of proper size is provided for corresponding to the desired gear ratio in the transmission box and the ratio of the rear wheel sprocket, not shown. The sprocket 15 may be stamped from one solid piece of metal and provided with no holes such as is provided in usual sprockets, the sprocket being provided with the guard to prevent operator injury since crank arms and sprockets turn at different speeds. Mounting of the gear box to the bicycle may be provided by suitable flanges 16 and bolts 17. The transmission box may be provided in kit form so they can be installed on bicycles already in existence.

The pedal crank arms turn on bearings or bushings sealed with grease seals and deliver basic pedal energy to the gear box. This energy is returned to the sprocket 15 in selected ratios according to the operator's need. Pedal shaft 18 turns through a center of the sprocket. A control cable 19 is connected to the lever arm 14, and a sprocket chain 20 transmits motion from sprocket 15 to the rear wheel sprocket.

Within the transmission box, pedal shaft energy is delivered to a gear through a hollow shaft and transmitted by a cluster gear arrangement on an idler shaft to other gears and returned to a sprocket and transmitted to the rear wheel by the chain. Compound gear action for higher or lower gear ratios are obtained by addition of cluster gear patterns.

Thus there is provided a bicycle transmission wherein as many as 15 forward speeds are availabe by changing control levers mounted on the handle bars or other desirable location. And the speeds may be varied up or down at will without loss of motion or slippeage.

What I now claim is:

1. In a bicycle transmission, the combination of a gear box mounted in place of a pedal crank, said gear box containing gear train arrangements, said gear train arrangement on an idler shaft to other gears and returns to a sprocket and transmitted to a rear bicycle wheel by means of a chain, and a lever arm for gear selection being mounted at handle bars of the bicycle for changing gears by an operator, said lever arm being attached to selector forks inside transmission for changing to a desired gear ratio.

2. The combination as set forth in claim 1, wherein said gear box includes a filler plug and dip stick for maintaining a proper level of a lube oil contained within said gear box.

3. The combination as set forth in claim 2, wherein said gear box includes no external sprockets except for one at the pedal crank and one at the rear wheel of said bicycle.

4. The combination as set forth in claim 3, wherein speeds can be varied up or down at will without loss of motion or slippage.

* * * * *